United States Patent
Jin

(10) Patent No.: US 7,158,811 B2
(45) Date of Patent: Jan. 2, 2007

(54) CIRCUIT FOR SUPPLYING EAR-MICROPHONE BIAS POWER FOR EAR/MICROPHONE IN MOBILE TERMINAL

(75) Inventor: Hyun-Cheol Jin, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 329 days.

(21) Appl. No.: 10/920,664

(22) Filed: Aug. 18, 2004

(65) Prior Publication Data

US 2005/0164631 A1 Jul. 28, 2005

(30) Foreign Application Priority Data

Jan. 24, 2004 (KR) .................. 10-2004-0004558

(51) Int. Cl.
*H04B 1/38* (2006.01)
*H04M 1/00* (2006.01)
(52) U.S. Cl. .................. 455/557; 455/569.1; 455/574
(58) Field of Classification Search ............. 455/550.1, 455/557, 569.1, 572, 574, 575.6, 343.1, 350; 381/74, 122; 379/431
See application file for complete search history.

(56) References Cited

U.S. PATENT DOCUMENTS

| | | | |
|---|---|---|---|
| 6,397,087 B1* | 5/2002 | Kim et al. | 455/569.1 |
| 2001/0034253 A1* | 10/2001 | Ruschin | 455/569 |
| 2004/0121796 A1* | 6/2004 | Peng | 455/522 |

* cited by examiner

*Primary Examiner*—Nguyen T. Vo
(74) *Attorney, Agent, or Firm*—The Farrell Law Firm

(57) ABSTRACT

Disclosed is a circuit for supplying ear-microphone bias power in a mobile terminal that reduces power consumption due to unnecessary ear-microphone bias when the terminal is in a sleep mode with an ear/microphone being connected to the terminal through an ear-microphone line. The ear/microphone has a call switch connected to the ear-microphone line. The circuit receives first and second powers through first and second power input terminals, respectively. The first power is supplied when the terminal is not in the sleep mode, whereas the second power having a voltage lower than that of the first power is supplied also in the sleep mode. The circuit supplies ear-microphone bias power, based on the first power, to the ear-microphone line when not in the sleep mode, and supplies power for detecting a switching operation of the call switch, based on the second power, to the ear-microphone line in the sleep mode.

7 Claims, 2 Drawing Sheets

CIRCUIT FOR SUPPLYING EAR-MICROPHONE BIAS POWER FOR EAR/MICROPHONE IN MOBILE TERMINAL

PRIORITY

This application claims priority to an application entitled "CIRCUIT FOR SUPPLYING EAR-MICROPHONE BIAS POWER FOR EAR/MICROPHONE IN MOBILE TERMINAL", filed in the Korean Intellectual Property Office on Jan. 24, 2004 and assigned Serial No. 2004-4558, the contents of which are hereby incorporated by reference.

BACKGROUND OF THE INVENTION

1. Field of the Invention

The present invention relates to a mobile terminal, and more particularly to an ear/microphone connection circuit in a mobile terminal for connecting the mobile terminal with an ear/microphone that includes a call switch connected to an ear-microphone line.

2. Description of the Related Art

An ear/microphone (i.e. an earphone/microphone), which has a call switch to receive, send or end a call, is widely used for hands free communication with a mobile terminal. The ear/microphone includes a speaker (i.e. an earphone) and a microphone, which are hereinafter referred to as an "ear-speaker" and an "ear-microphone", respectively. When an ear/microphone is connected to a mobile terminal, a user can hear audio outputted from the terminal and input audio to the terminal using the ear/microphone, instead of using a microphone and a speaker mounted on the terminal. To connect the ear/microphone to the mobile terminal, the ear/microphone has a plug and the mobile terminal has a corresponding ear/microphone jack. If the user inserts the plug of the ear/microphone into the ear/microphone jack of the mobile terminal, an ear-speaker and an ear-microphone of the ear/microphone are electrically connected to an ear/microphone connection circuit in the mobile terminal.

The ear/microphone connection circuit checks whether the ear/microphone is connected to the mobile terminal. When the ear/microphone is connected to the mobile terminal, the ear/microphone connection circuit receives an audio signal, outputted from the ear-microphone of the ear/microphone, from an ear-microphone line connected to the ear-microphone, and outputs an audio signal, which will be outputted through the ear-speaker of the ear/microphone, to an ear-speaker line connected to the ear-speaker.

The ear/microphone includes a call switch called a "send/end button". The user pushes the call switch when he or she wishes to receive an incoming call, to send an ongoing call or to end a call. The call switch can also be used to redial a recently dialed number. To accomplish this, the ear/microphone connection circuit in the mobile terminal also detects a switching operation of the call switch.

FIG. 1 is a circuit diagram showing a conventional ear/microphone connection circuit 106 in a mobile terminal, to which an ear-microphone 102 in an ear/microphone 100 is connected. This figure does not show a mechanical structure for connection between the ear/microphone 100 and the ear/microphone connection circuit 106, in which a plug of the ear/microphone 100 is inserted into an ear/microphone jack, allowing the ear/microphone 100 to be electrically connected to the ear/microphone connection circuit 106. This figure also does not show an ear-speaker in the ear/microphone 100, and a portion of the ear/microphone connection circuit 106 whereby an audio signal is outputted to the ear-speaker of the ear/microphone 100. The configuration of the plug and ear-speaker are known to those of ordinary skill in the art.

The ear-microphone 102 in the ear/microphone 100 is connected in parallel with a call switch 104 for receiving an incoming call, or sending or ending a call, as described above. When the plug of the ear/microphone 100 is not inserted in the ear/microphone jack, a switch 110 in the ear/microphone connection circuit 106 is switched to a connection terminal Pb. On the other hand, when the plug of the ear/microphone 100 is inserted in the ear/microphone jack, the switch 110 is switched to a connection terminal Pa. The connection terminal Pa is connected to an ear-microphone line 108, which is connected to the ear-microphone 102 in the ear/microphone 100 when the ear/microphone 100 is connected to the ear/microphone connection circuit 106. The connection terminal Pb is connected to an inverting input (−) of a comparator 112 for detecting whether the ear/microphone 100 is connected to the circuit 106.

The comparator 112 is driven by power source VPD. A capacitor C2 and a resistor R3 are connected between the inverting input (−) of the comparator 112 and ground. A non-inverting input (+) of the comparator 112 is connected to a connection node between two resistors R1 and R2 that are connected in series between the power source VPD and ground. A reference voltage Vref, divided according to the resistance ratio of the resistors R1 and R2, is inputted to the non-inverting input (+) of the comparator 112.

The voltage of power source VPA is dropped via two resistors R4 and R5 connected in series, and the dropped voltage is applied to a common terminal of the switch 110. A capacitor C3 is connected between ground and a connection node between the resistors R4 and R5. The common terminal of the switch 110 is connected to an inverting input (−) of the comparator 114 for detecting a switching operation of the call switch 104 in the ear/microphone 100, and it is also connected to an ear-microphone terminal Ear_Mic for the ear/microphone 100. The ear-microphone terminal Ear_Mic is connected to a codec (coder-decoder) (not shown) that receives and processes an audio signal outputted from the ear-microphone 102. For example, if the mobile terminal is a CDMA (Code Division Multiple Access) mobile terminal, the ear-microphone terminal Ear_Mic is connected to a codec such as is provided in Qualcomm's MSM (Mobile Station Modem) chip (not shown).

The comparator 114 is driven by the power VPD. A capacitor C1 is connected between the inverting input (−) of the comparator 114 and ground. A non-inverting input (+) of the comparator 114 is connected to a connection node between the two resistors R1 and R2 connected in series between ground and the power source VPD. The reference voltage Vref, divided according to the resistance ratio of the resistors R1 and R2, is inputted to the non-inverting input (+) of the comparator 114.

The power source VPA supplies power for driving an analog circuit of the mobile terminal, whereas the power source VPD supplies power for driving a digital circuit of the mobile terminal. For example, each of the power sources VPA and VPD provides a supply voltage of 2.8 Volts. The resistances of the resistors R1 and R2 are determined so that the reference voltage Vref is, for example, 0.25 Volts.

The ear/microphone connection circuit 106 employs two resistors R4 and R5 to drop the supply voltage (for example, 2.8 Volts) by about half (for example, to 1.5 Volts), and supplies the voltage-dropped power as ear-microphone bias power to the ear-microphone line 108, so as to prevent distortion of an audio signal from the ear-microphone 102.

When the ear/microphone 100 is connected to the ear/microphone connection circuit 106, the switch 110 is switched to the connection terminal Pa, thereby allowing the ear-microphone bias power to be supplied to the ear-microphone 102 via the ear-microphone line 108 connected to the ear-microphone 102.

When the plug of the ear/microphone 100 is not inserted in the ear/microphone jack, the switch 110 is switched to the connection terminal Pb. In this case, the comparator 112 outputs a "low" signal since ear-microphone bias power of a voltage higher than the reference voltage Vref is inputted to the inverting input (−) of the comparator 112. Under this condition, if the plug of the ear/microphone 100 is inserted into the ear/microphone jack, the switch 110 is switched to the connection terminal Pa. This causes the comparator 112 to output a "high" signal since the ear-microphone bias power is not inputted to the inverting input (−) of the comparator 112. A signal outputted from the comparator 112 is applied to a controller (not shown) of the mobile terminal via a comparison signal terminal Comp1. For example, if the mobile terminal is a CDMA mobile terminal, the controller is Qualcomm's MSM chip. Based on the signal outputted from the comparator 112 via the comparison signal terminal Comp1, the controller, to which the output signal is applied, determines whether the ear/microphone 100 is connected to the mobile terminal.

While the plug of the ear/microphone 100 is inserted in the ear/microphone jack, and thus the switch 110 is switched to the connection terminal Pa, the comparator 114 detects a switching operation of the call switch 104 in the following manner. If the call switch 104 is in an off position (i.e. open), the comparator 114 outputs a "low" signal since ear-microphone bias power of a voltage higher than the reference voltage Vref is inputted to the inverting input (−) of the comparator 114. Under this condition, if the user presses the call switch 104 to turn it on, the comparator 114 outputs a "high" signal since the ear-microphone bias power is not inputted to the inverting input (−) of the comparator 114. As with the signal outputted from the comparator 112, a signal outputted from the comparator 114 is applied to the controller of the mobile terminal via a comparison signal terminal Comp2. Based on the signal outputted from the comparator 114 via the comparison signal terminal Comp2, the controller detects the switching operation of the call switch 104.

The ear/microphone connection circuit as described above uses the ear-microphone bias power also as power for detecting the switching operation of the call switch. However, a voltage for detecting the switching operation of the call switch may be lower than a voltage for biasing (or driving) the ear-microphone since a voltage needed to detect the switching operation of the call switch is at a level where it is just detectable by the comparator, which is different from a voltage needed to bias the ear-microphone.

It is necessary to supply power for detecting the switching operation of the call switch even when the mobile terminal is in a sleep mode. This is because if the user turns on the call switch even when the mobile terminal is in a sleep mode, the mobile terminal must detect the turning on of the call switch to shift to an idle mode. On the other hand, it is not required to supply power for biasing the ear-microphone when the mobile terminal is in the sleep mode since the ear-microphone is not used in the sleep mode.

However, even when the mobile terminal is in the sleep mode, it continues to supply the ear-microphone bias power, which is used to detect a switching operation of the call switch. Accordingly, the ear-microphone bias power will provide an unnecessarily high voltage to forms a current path via the ear-microphone 102 of the ear/microphone 100. Accordingly, compared to when the ear/microphone is not connected to the mobile terminal, standby power consumption increases when the ear/microphone is connected to the mobile terminal, thereby reducing the standby time and battery life.

SUMMARY OF THE INVENTION

Therefore, the present invention has been made in view of the above problem, and it is an object of the present invention to provide a circuit for supplying ear-microphone bias power for an ear/microphone in a mobile terminal, which makes it possible to reduce power consumption due to unnecessary ear-microphone bias power in a sleep mode when an ear/microphone is connected to the mobile terminal.

In accordance with the present invention, the above and other objects can be accomplished by the provision of a circuit for supplying ear-microphone bias power for an ear/microphone in a mobile terminal, wherein when the mobile terminal is connected to an ear/microphone including a call switch connected to an ear-microphone line, the circuit supplies ear-microphone bias power to the ear-microphone line, and detects a switching operation of the call switch based on a signal on the ear-microphone line, said circuit comprising a first power input terminal through which first power is inputted, said first power being supplied when the mobile terminal is not in a sleep mode and not supplied when the mobile terminal is in the sleep mode, said first power having a voltage capable of being supplied as the ear-microphone bias power; a second power input terminal through which second power is inputted, said second power being supplied also when the mobile terminal is in the sleep mode, said second power having a voltage that is lower than the voltage of the first power and capable of being supplied as switching-operation detection power for detecting the switching operation of the call switch; and a power switching circuit for supplying the ear-microphone bias power based on the first power to the ear-microphone line when the mobile terminal is not in the sleep mode, and supplying the switching-operation detection power based on the second power to the ear-microphone line when the mobile terminal is in the sleep mode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted to avoid making the subject matter of the present invention unclear.

Figure 1:
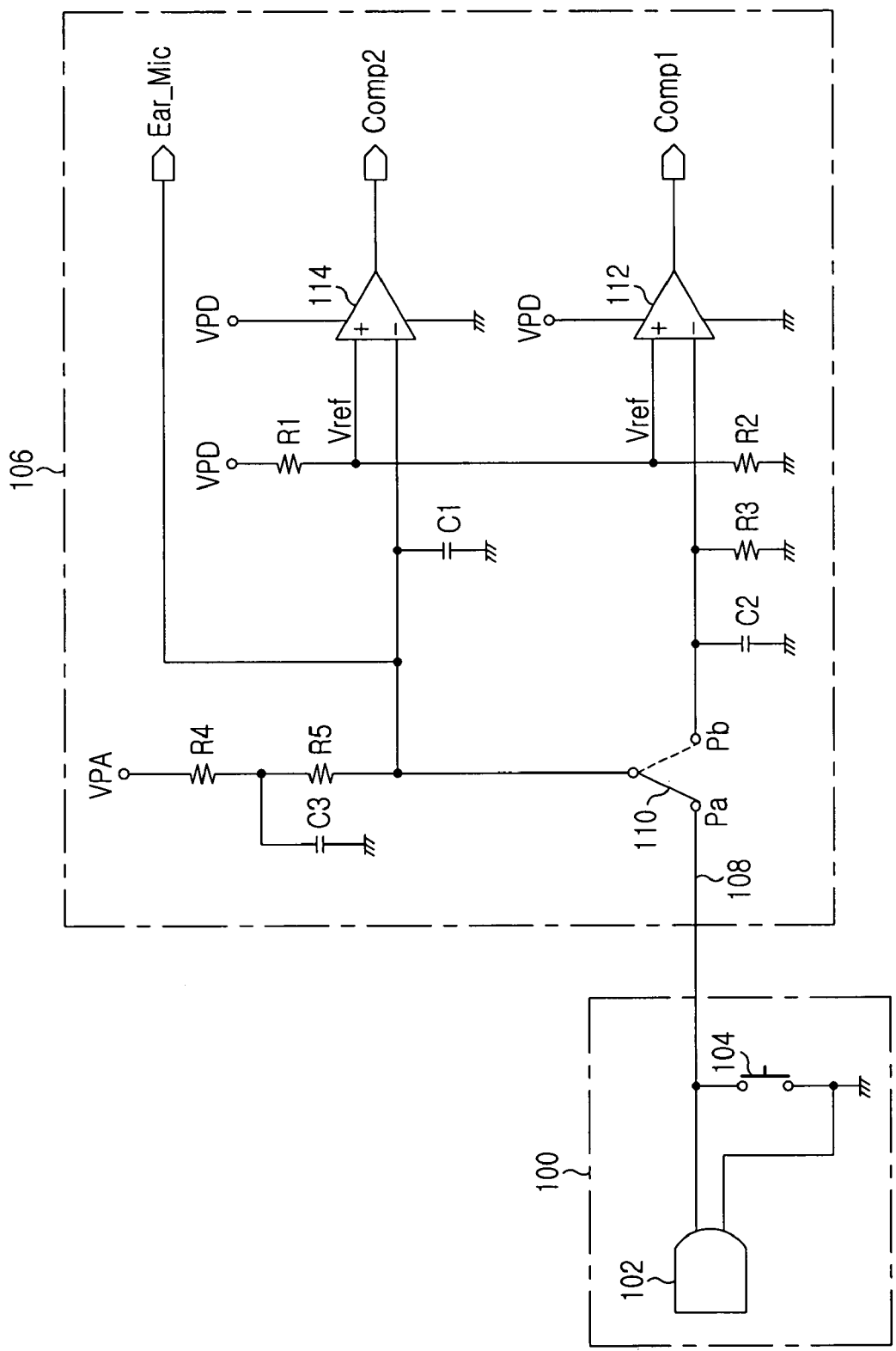
FIG. 1 is a circuit diagram showing a conventional ear/microphone connection circuit in a mobile terminal, to which an ear-microphone in an ear/microphone is connected.
Figure 2:
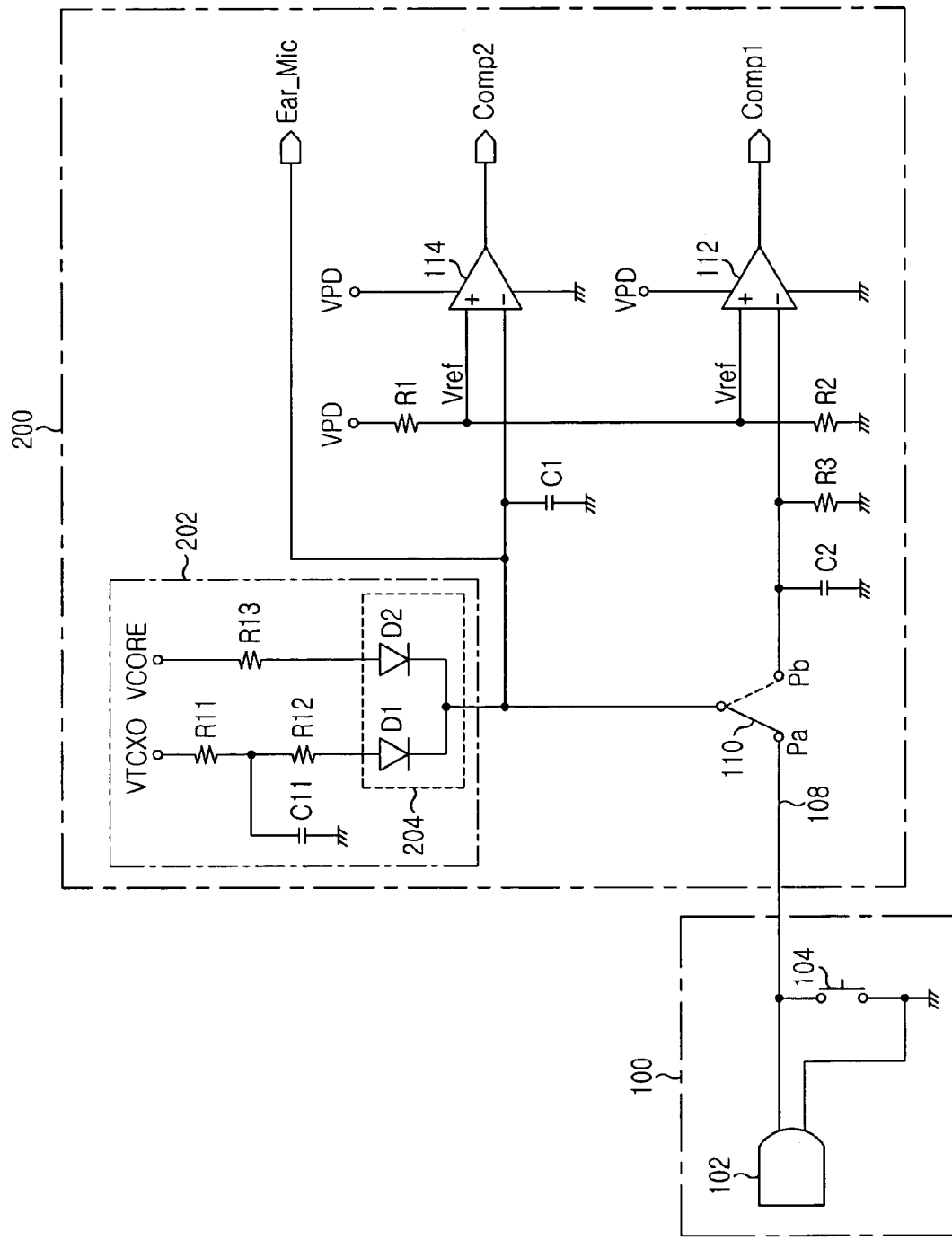
FIG. 2 is a circuit diagram showing an ear/microphone connection circuit according to an embodiment of the present invention to which an ear-microphone in an ear/microphone is connected.

FIG. 2 is a circuit diagram showing an ear/microphone connection circuit 200 according to an embodiment of the present invention to which an ear-microphone 102 in an ear/microphone 100 is connected. As described above, the conventional ear/microphone connection circuit 106 of FIG. 1 drops the voltage of the supply power VPA through the resistors R4 and R5 and supplies the dropped voltage as ear-microphone bias power, which is also used as power for detecting the switching operation of the switch 104. The ear/microphone connection circuit 200 of FIG. 2 differs from the conventional ear/microphone connection circuit 106 of FIG. 1 in that a circuit 202 for supplying ear-microphone bias power is provided to supply ear-microphone bias power or switching-operation detection power for a call switch 104, both power having different voltages, in different ways, depending on whether the mobile terminal is in a sleep mode.

With the exception of the ear-microphone bias power supply circuit 202, elements in the ear/microphone connection circuit 200 of FIG. 2 are the same as the corresponding elements in the ear/microphone connection circuit 100 of FIG. 1. An ear/microphone 100 of FIG. 2 is also the same as that of FIG. 1. For simplicity, these same elements are denoted by the same reference numerals.

However, as will be described below, the respective resistances of resistors R1 and R2 of FIG. 2 are determined differently from those of FIG. 1, so as to apply a lower reference voltage Vref, compared to that of FIG. 1, to each of the non-inverting inputs (+) of comparators 112 and 114, in order to minimize the voltage for detecting the switching operation of a call switch 104 when the mobile terminal is in a sleep mode. As described above, comparator 114 compares the voltage of the ear-microphone bias power with the reference voltage Vref. Experimental results have showed that the comparators 112 and 114 can perform normal comparison operations even when the reference voltage Vref is dropped to typically 30 millivolts (i.e. 0.03V).

The ear-microphone bias power supply circuit 202 includes one power input terminal through which reference frequency oscillator operating power (VTCXO) is inputted to the circuit 202, and another power input terminal through which Vcore power (VCORE) is inputted to the circuit 202. The reference frequency oscillator operating power (VTCXO) is generally used to apply a voltage for operating a reference frequency oscillator that oscillates at a reference frequency in a mobile terminal. The reference frequency oscillator operating power (VTCXO) is supplied when the mobile terminal is not in a sleep mode, but not supplied when it is in the sleep mode. The power (VTCXO) has a voltage of typically 2.8 Volts, which can be supplied as microphone bias power.

On the other hand, the Vcore power (VCORE) is generally used to operate core components that must also operate when the mobile terminal is in the sleep mode. Thus, the Vcore power (VCORE) is supplied also when the mobile terminal is in the sleep mode, and typically has a voltage of 1.3 Volts, which can be supplied as power for detecting the switching operation of the call switch 104 although it is lower than the voltage of the reference frequency oscillator operating power (VTCXO).

Two resistors R11 and R12 are connected in series to the power input terminal through which the reference frequency oscillator operating power (VTCXO) is inputted to the circuit 202. Through the two resistors R11 and R12, a voltage of the reference frequency oscillator operating power (VTCXO) is dropped to a voltage required to bias the ear-microphone (i.e. typically 1.5 Volts, as described above), and the voltage-dropped power is outputted to a power switching circuit 204. A resistor R13 is connected to the power input terminal through which the Vcore power (VCORE) is inputted to the circuit 202. Through the resistor R13, a voltage of the Vcore power (VCORE) is dropped to a voltage required to detect the switching operation of the call switch 104, and the voltage-dropped power is outputted to the power switching circuit 204. The resistance of the resistor R13 is determined so that via the resistor R13, the voltage of the Vcore power (VCORE) is dropped to the minimum voltage that can be compared with the reference voltage Vref by the comparator 114. If the reference voltage Vref is set to 0.03 Volts as described above, the minimum voltage is set higher than 0.03 Volts.

The power switching circuit 204 includes two diodes D1 and D2. The voltage-dropped power, whose voltage is dropped from the voltage of the power (VTCXO) via the resistors R11 and R12, is inputted to the diode D1 through an anode thereof. The voltage-dropped power, whose voltage is dropped from the voltage of the Vcore power (VCORE) via the resistor R13, is inputted to the diode D2 through an anode thereof. Cathodes of the diodes D1 and D2 are commonly connected to a common terminal of the switch 110. Accordingly, while the ear/microphone 100 is connected to the mobile terminal (i.e. to the ear/microphone connection circuit 200), the power switching circuit 204 supplies power based on the reference frequency oscillator operating power (VTCXO) to the ear-microphone line 108 if the mobile terminal is not in the sleep mode, whereas it supplies power based on the Vcore power (VCORE) to the ear-microphone line 108 if the mobile terminal is in the sleep mode.

In detail, if the mobile terminal is not in the sleep mode, the reference frequency oscillator operating power (VTCXO) is outputted from the power switching circuit 204 through the diode D1 after the voltage of the power (VTCXO) is dropped via the resistors R1 and R12. Since the voltage of power outputted from the diode D1 is higher than the voltage applied to the anode of the diode D2 via the resistor R13, only the power outputted from the diode D1 is applied to the ear-microphone line 108. Accordingly, if the mobile terminal is not in the sleep mode, the power outputted from the diode D1 is applied, as ear-microphone bias power having a voltage by which the ear-microphone 102 can be biased (or driven), to the ear-microphone line 108. Since the power outputted from the diode D1 is applied to the diode D2 in the backward (or reverse) direction, the ear-microphone bias power has no influence on the Vcore power (VCORE). With the ear-microphone bias power applied to the ear-microphone line 108, the comparator 114 also detects the switching operation of the switch 104 normally.

On the other hand, if the mobile terminal is in the sleep mode, the reference frequency oscillator operating power (VTCXO) is not supplied. However, since the Vcore power (VCORE) is continuously supplied even when the mobile terminal is in the sleep mode, the Vcore power (VCORE) is outputted through the diode D2 after the voltage thereof is dropped via the resistor R13. Here, only the power outputted from the diode D2 is applied to the ear-microphone line 108 because no power is outputted from the diode D1. When the mobile terminal is in the sleep mode, the power applied to the ear-microphone line 108 is lower than a voltage needed to bias (or drive) the ear-microphone 102 in the ear/microphone 100. However, the comparator 114 can detect the switching operation of the call switch 104 normally in the sleep mode since the power applied to the ear-microphone line 108 in the sleep mode is of a voltage level capable of being detected as the switching operation of the call switch 104.

As described above, when the mobile terminal is not in the sleep mode, ear-microphone bias power based on the reference frequency oscillator operating power (VTCXO) is supplied to the ear-microphone line 108. On the other hand, when the mobile terminal is in the sleep mode, power based on the Vcore power (VCORE), having a voltage with which it is only possible to detect the switching operation of the call switch 104, is supplied to the ear-microphone line 108 because there is no need to bias the ear-microphone 102 in the sleep mode.

In the related art, as previously described, when the mobile terminal is in the sleep mode with the ear/microphone 100 being connected to the mobile terminal, ear-microphone bias power with an unnecessarily high voltage forms a current path via the ear-microphone 102 of the ear/microphone 100, thereby increasing the standby power consumption and thus decreasing the standby time and battery life. However, according to the present invention, when the mobile terminal is in the sleep mode with the ear/microphone 100 being connected to the mobile terminal, power consumption decreases, and thus the standby time and battery life increases, since power having a voltage with which it is only possible to detect the switching operation of the call switch 104 is applied to the ear-microphone 102.

As apparent from the above description, the present invention provides a circuit for supplying ear-microphone bias power for an ear/microphone in a mobile terminal, which has the following features and advantages. When the mobile terminal is not in a sleep mode with an ear/microphone being connected to a mobile terminal, ear-microphone bias power is supplied to an ear-microphone line. On the other hand, when the mobile terminal is in the sleep mode with the ear/microphone being connected to the mobile terminal, only switching-operation detection power is supplied to the ear-microphone line. The switching-operation detection power has a voltage with which it is possible to detect the switching operation of a call switch, and which is lower than a voltage of the ear-microphone bias power. Thus, the present invention has advantages in that it avoids power consumption due to unnecessary ear-microphone bias in the sleep mode, and thereby increases the standby time (i.e. prevents the reduction of the standby time due to the unnecessary power consumption in the sleep mode).

Although the preferred embodiments of the present invention have been disclosed for illustrative purposes, various modifications are possible without departing from the scope and spirit of the invention.

In particular, the embodiments of the present invention have been described with reference to an example in which reference frequency oscillator operating power (VTCXO) is supplied as ear-microphone bias power after the voltage of the power (VTCXO) is dropped, whereas Vcore power (VCORE) is supplied as switching-operation detection power of the call switch 104 after the voltage of the power (VCORE) is dropped. However, it is also possible to use power other than the reference frequency oscillator operating power (VTCXO) and the Vcore power (VCORE). In other words, if there is power that is supplied when the mobile terminal is not in the sleep mode but not supplied when it is in the sleep mode, the power can be used instead of the reference frequency oscillator operation power (VCTXO). Similarly, if there is power that is supplied also when the mobile terminal is in the sleep mode, the power can be used instead of the Vcore power (VCORE).

While the invention has been shown and described with reference to certain preferred embodiments thereof, it will be understood by those skilled in the art that various changes in form and details may be made therein without departing from the spirit and scope of the invention as defined by the appended claims. Accordingly, the scope of the present invention should not be limited to the above embodiments, but defined by the accompanying claims as well as equivalents thereof.

What is claimed is:

1. A circuit for supplying ear-microphone bias power to an ear/microphone having a call switch connected to an ear-microphone line in a mobile terminal, the circuit supplying ear-microphone bias power to the ear-microphone line and detecting a switching operation of the call switch based on a signal on the ear-microphone line, said circuit comprising:

a first power input terminal through which first power is inputted, said first power being supplied when the mobile terminal is not in a sleep mode and not supplied when the mobile terminal is in the sleep mode, said first power having a voltage capable of being the ear-microphone bias power;

a second power input terminal through which second power is inputted, said second power being supplied when the mobile terminal is in the sleep mode, said second power having a voltage that is lower than the voltage of the first power and being supplied as switching-operation detection power for detecting the switching operation of the call switch; and a power switching circuit for supplying the ear-microphone bias power based on the first power when the mobile terminal is not in the sleep mode, and supplying the switching-operation detection power based on the second power when the mobile terminal is in the sleep mode.

2. The circuit according to claim 1, wherein the power switching circuit includes a first diode whose anode is connected to the first power input terminal, and a second diode whose anode is connected to the second power input terminal, each of the first and second diodes having a cathode connected to the ear-microphone line.

3. The circuit according to claim 2, further comprising resistors for dropping respective voltage levels of the first and second powers and then applying the first and second powers respectively to the first and second diodes.

4. The circuit according to claim 1, further comprising resistors for dropping respective voltage levels of the first and second powers and then applying the first and second powers to the power switching circuit.

5. The circuit according to claim 1, wherein the first power is reference frequency oscillator operating power of the mobile terminal.

6. The circuit according to claim 1, wherein the second power is Vcore power of the mobile terminal.

7. The circuit according to claim 1, wherein the first power is reference frequency oscillator operating power of the mobile terminal, and the second power is Vcore power of the mobile terminal.

* * * * *